Sept. 29, 1970  J. M. PORTER  3,530,684
HIGH PRESSURE GENERATOR SOLUTION LEVEL CONTROL
Filed Nov. 12, 1968
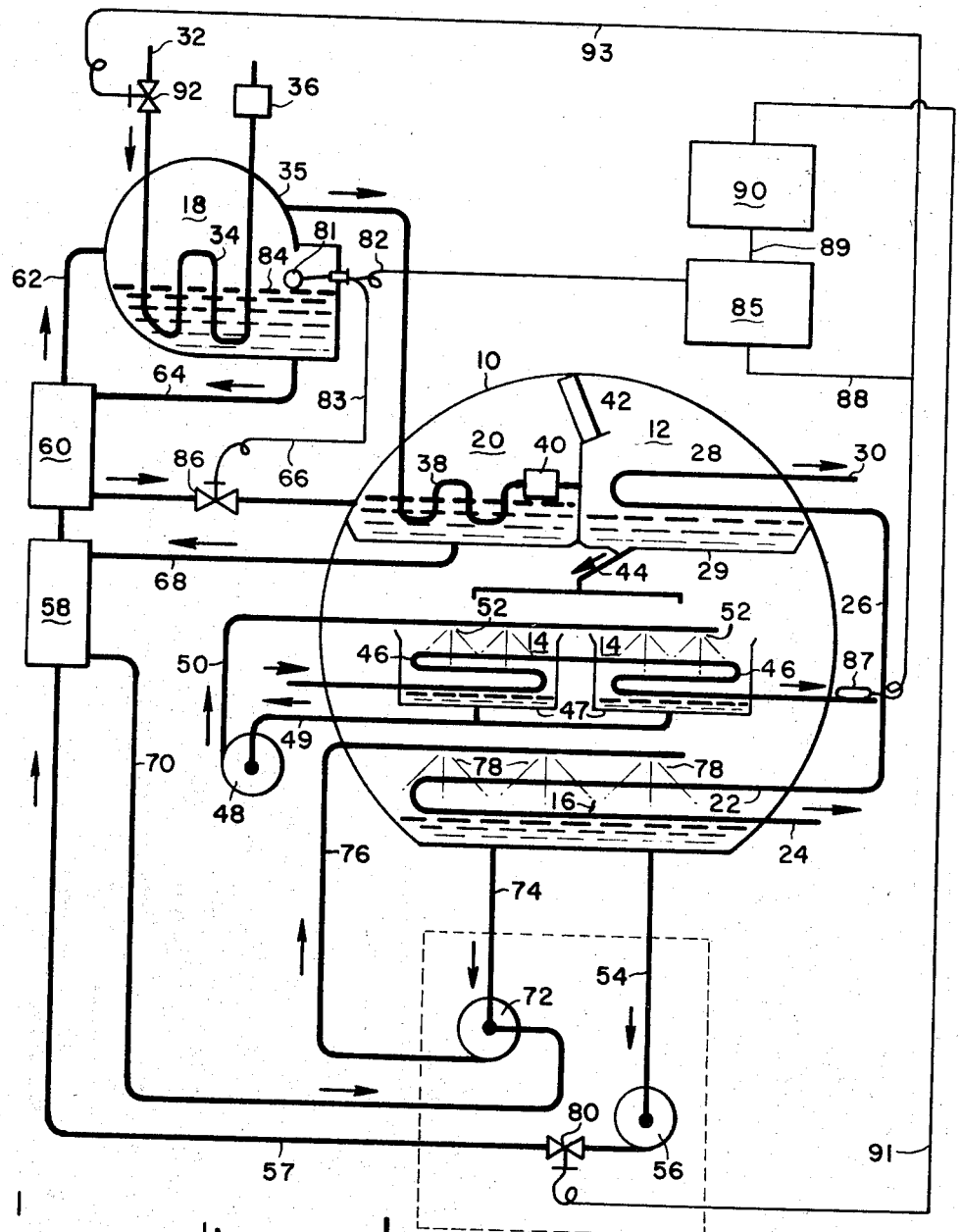
FIG. 1
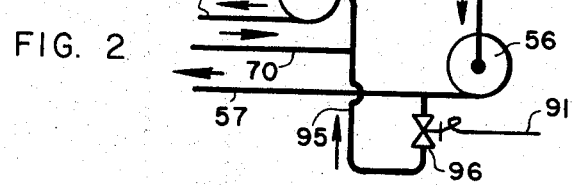
FIG. 2
INVENTOR.
JAMES M. PORTER
BY
ATTORNEY

United States Patent Office 3,530,684
Patented Sept. 29, 1970

3,530,684
HIGH PRESSURE GENERATOR SOLUTION LEVEL CONTROL
James M. Porter, La Crosse, Wis., assignor to The Trane Company, La Crosse, Wis., a corporation of Wisconsin
Filed Nov. 12, 1968, Ser. No. 774,805
Int. Cl. F25b 15/00
U.S. Cl. 62—148                                 8 Claims

ABSTRACT OF THE DISCLOSURE

A control circuit is provided which senses the level of intermediate strength absorbent solution in the high pessure generator of an absorption refrigeration machine. The signal from the level sensor is sent to a modulating valve on the outlet conduit from the high pressure generator and to a pressure selector. An additional signal from a thermostat sensing the leaving chilled water temperature is also sent to the pressure selector. The same signal is also relayed to a valve on the high pressure steam inlet to the high pressure generator for modulation in response to load on the absorption machine. The pressure selector sends the proper signal from the level control and the thermostat sensor to another valve in the conduit leading from the absorber to the high pressure generator to modulate the flow into the high pressure generator.

BACKGROUND OF THE INVENTION

This invention relates to an absorption refrigeration machine having a two-stage generator and particularly to a control system for maintaining the solution in the first stage generator at a predetermined level.

Upon starting an absorption refrigerator machine, there is an increased refrigerant demand. This demand requires more refrigerant production in the generator portion of the machine. At this time weak solution is pumped from the absorber at a rate greater than the generator can produce refrigerant. If this condition persists too long, the generator will flood, upsetting refrigerant production in the two-stage generator system.

At low load, that is where the demand for chilled water is low, an increasing amount of absorbent solution is pumped to the generator. This also results in undesirable flooding of the generator portion of the absorption machine.

In addition, where the chilled water demand on the machine becomes too high after the machine has been operating for a time, refrigerant is produced at a high rate causing the pressure in the first stage of a two-stage generator system to rise. This increased pressure can cause the solution being concentrated in the first stage to blow through to the second stage.

This invention provides a coacting automatic control responsive to chilled water temperature and level of solution in the generator for controlling the level of absorbent solution in the generator at startup and at high and low load conditions.

SUMMARY OF THE INVENTION

This invention provides a novel control system in an absorption refrigeration machine which includes an evaporator, a chilled medium heat exchanger having an inlet and an outlet, an absorber, a first generator having a heat exchanger therein for concentrating weak absorbent solution, a first conduit means for conveying weak absorbent solution to a first generator, a second generator, a second conduit means for conveying intermediate strength absorbent solution to the second generator, a condenser, a third conduit means for conveying refrigerant vapor from the first generator to the second generator in which the vapor condenses and for conveying the resultant liquid to the condenser, a means placing the second generator in vapor communication with the condenser, a third conduit means for conveying refrigerant from the condenser to the evaporator, and a fourth conduit means for returning strong absorbent solution to the absorber. The improved control system comprises a liquid level sensing means in the first generator for transmitting a signal above and below a predetermined level, a first valve means in the second conduit means responsive to a signal from the liquid level sensing means, whereby when the liquid level rises beyond the predetermined level in the generator the first valve means opens and when the liquid level falls below the predetermined level the first valve means closes, a temperature sensing means in the chilled medium heat exchanger outlet for transmitting a signal responsive to and varying with chilled water temperature, a selector control means for transmitting a predetermined signal selected from either a liquid level sensing means or the temperature sensing means, a second valve means responsive to the signal transmitted from the selector control means, the second valve means being located in the first conduit means, and normally open to flow, the second valve means reducing flow in the first conduit means when the chilled water temperature falls below a predetermined point or when the liquid level in the generator rises above a predetermined level. The preferred control system is one which derives its actuating energy from a constant pressure pneumatic source.

BRIEF DESCRIPTION OF THE DRAWINGS

FIG. 1 is a schematic illustration of an absorption machine employing the control system of the instant invention.

FIG. 2 illustrates an alternative control system to that shown in FIG. 1.

DESCRIPTION OF THE PREFERRED EMBODIMENTS

FIG. 1 schematically illustrates an absorption refrigeration machine comprising a fluid tight shell 10 enclosing a condenser 12, a two section evaporator 14, an absorber 16, and a second stage generator 20. The first stage generator is enclosed by fluid tight shell 35.

The absorber 16 has a heat exchanger 22 supplied with cooling fluid from a source 24 to remove heat from the absorber. Source 24 can be water which is evaporatively cooled by air. This cooling fluid is conducted by a conduit 26 to a heat exchanger 28 in the condenser 12. A wall 29 substantially encloses the condenser section. The cooling fluid leaves the condenser through a conduit 30.

High pressure steam flows from a source 32 such as a boiler to a heat exchanger 34 in the first stage generator 18. The first stage generator is enclosed in a separate shell 35. Heat exchanger 34 terminates in restrictor means 36. Restrictor means 36 can be any suitable steam flow restrictor such as orifice or a float valve. Valve 36 allows substantially no steam to pass from heat exchanger 34. Heat from condensing steam in the heat exchanger 34 causes dilute absorbent solution in the first stage generator to boil. The steam condensate from trap 36 flows back to the steam generating source. Of course a combustible fluid, direct fired heat exchanger can be substituted for heat exchanger 34 without modifying the principles of this invention.

Various types of refrigerants and absorbents may be used in the present machine. A solution of lithium bromide absorbent in a refrigerant such as water is satisfactory. Other suitable absorbents and refrigerants may be used if desired. The term "concentrated solution" as used herein means a solution which is concentrated in absorbent. A "weak solution" is a solution dilute in absorbent.

The refrigerant vapor generated in the first stage generator 18 flows through a heat exchanger 38 in the second stage generator 20. A flow regulating device 40 in the form of an orifice or trap regulates the flow of liquid refrigerant from the heat exchanger 38 to the condenser 12. The heat from heat exchanger 38 causes the solution in the second stage generator to boil. The vapor from the second stage 20 passes through a liquid eliminator 42 into the condenser 12 in which the refrigerant vapor is condensed to a liquid. The total liquid refrigerant flows through a conduit 44 to the evaporators 14.

Absorbent solution in the absorber 16 absorbs refrigerant vapor from the evaporators 14 thus removing latent heat from the heat exchanger 46 in which fluid from a heat load is chilled and recirculated to the heat load. Heat exchanger 46 comprises a plurality of tubes in each of the two evaporator sections 14. Refrigerant liquid dripping from the heat exchanger 46 is collected by a pan 47 from which is flows through a conduit 49 to a pump 48 which delivers the refrigerant liquid through conduit 50 to be sprayed in the evaporators 14 through nozzles 52.

Solution from the absorber 16 flows through conduit 54, pump 56, through conduit 57 to low temperature heat exchanger 58, to high temperature heat exchanger 60, and through conduit 62 to the first stage generator 18 in which it is partially concentrated.

The partially concentrated solution flows through conduit 64 from first stage generator 18 to high temperature heat exchanger 60 and thereafter through conduit 66 to second stage generator 20 in which it is further concentrated. The concentrated solution from the second stage generator 20 flows through conduit 68 to low temperature heat exchanger 58 and then through conduit 70 to pump 72. Dilute solution flows from absorber 16 through conduit 74 to pump 72 to mix with concentrated solution flowing from conduit 70 to pump 72. The mixed solution flows from pump 72 through conduit 76 and is discharged through nozzles 78 into the absorber 16.

It is very desirable to maintain a proper operating level for the solution in the high pressure or first stage generator. This level of course must be determined for each size absorption machine which is produced. A conventional J-type overflow is impractical since the pressure difference between the first stage generator and the remainder of the machine exceeds design limitations of a practical liquid trap or seal. In FIG. 1 an economizer valve 80 is placed in conduit 57. This valve has a twofold purpose. First it throttles absorbent solution flow to the high pressure generator 18 under low load conditions. Additionally, on startup of the machine, a low head exists in conduit 62, resulting in an increased absorbent solution flow to generator 18. The valve 80 functions to throttle this flow to prevent flooding of generator.

A solution level sensor 81 is placed in generator 18. The level sensor 81 transmits a signal through lines 82 and 83, which signal is dependent upon the solution level 84. In the preferred embodiment, as the solution level 84 rises, the output signal of the sensor 81 drops. This signal is fed through lines 82 and 83 to a signal selector 85 and to a level control valve 86 located in conduit 66. The selector 85 also receives a signal from a temperature sensor or thermostat 87. This signal is received through transmission line 88. The thermostat 87 transmits a signal responsive to the temperature of the chilled medium leaving the evaporators 14 through conduit 46. In the preferred embodiment the output signal of the thermostat decreases as the chilled water temperature decreases.

The selector 85 chooses a predetermined signal from lines 82 and 88; in the preferred embodiment, the lower of the two signals is selected. This signal is transmitted through line 89 to a switching relay 90. The switching relay transmits an on-off signal through line 91 to valve 80. Preferably the off signal to valve 80 causes the valve to close only to a predetermined minimum closing point. If proportional control were desired at valve 80, the selector signal could be transmitted directly to control valve 80. Thus as the solution level in the generator rises or as the chilled water temperature decreases, the lower of the two signals responsive to the predetermined conditions can cause valve 80 to throttle, reduce solution flow to the generator and thereby prevent flooding of the generator or reduce the energy requirement of the machine at low load.

FIG. 2 is an alternative arrangement for the portion of FIG. 1 within the broken line box. This control scheme represents a diverting means rather than throttling. Bypass conduit 95 is inserted between conduits 57 and 70. Valve 96 is placed in the bypass conduit 95 and replaces valve 80 of FIG. 1. Valve 96 is made responsive to the signal from control line 91. However, the valve 96 reacts oppositely from the control of valve 80. In the preferred embodiment as the signal in line 91 lowers, valve 96 will open and allow weak absorbent solution to return to the absorber through pump 72 and conduit 76. This arrangement effectively compensates for low demand and generator flooding on startup.

As the solution level in generator 81 drops, level sensor 81 transmits a rising signal. This signal is transmitted through line 83 to control valve 86. As the solution level 84 lowers, the transmitted signal causes valve 86 to close, thus preventing the solution from high pressure generator 18 from blowing through to the low pressure generator 20. This control also prevents damage to the generator 18 and heat exchanger 34 which could be caused by absence of solution in the generator 18.

The preferred control system as shown in FIG. 1 is pneumatically powered, that is a constant pressure source is provided to the components of the system requiring a source pressure. The level sensor 81 can be of the type, No. 6580 Modulevel Controller, manufactured by Magnetrol Inc. of Downers Grove, Ill. The pressure selector 85 can be of the type, Model No. 243–0002, manufactured by The Powers Regulator Co. of Skokie, Ill. Likewise, the switching relay can be of the type, Model No. 243–0001, manufactured by The Powers Regulator Co. of Skokie, Ill. The control valves 80, 86 and 92 can be any of the commonly known pneumatically operated valves suitable to this particular application. The arrangement for FIG. 2 would require either a reverse-acting switching relay or a reverse-acting valve.

The thermostat 87, in addition to transmitting a signal to the signal selector 85, transmits the same signal to control valve 92 via line 93. As the chilled water temperature decreases, the signal in line 93 decreases. The lowering signal in line 93 will cause valve 92 to reduce steam flow to the heat exchanger 34. Thus steam consumption is made proportionally responsive to lower demand on the absorption machine. Of course, if other energy sources were utilized to replace the steam, control valve 92 could be replaced by a gas or oil valve in a direct-fired generator or by a power limiting device for an electrical supply. That is, the throttling means is a power limiting device for any suitable energy source to the first stage generator.

The utility of this invention is readily apparent to one skilled in the art. This control system increases operating efficiency and economy of operation of an absorption refrigeration machine.

What is claimed is:
1. In an absorption refrigeration machine including an evaporator, chilled medium heat exchanger located in heat exchange relationship with said evaporator having an inlet and an outlet, absorber, first generator having a heat exchanger therein for concentrating weak absorbent solution, first conduit means for conveying weak absorbent solution to said first generator from said absorber, second generator, second conduit means for conveying intermediate strength absorbent solution to said second generator, condenser, third conduit means for conveying refrigerant vapor from said first generator to said second generator in which said vapor condenses and for conveying the resultant liquid to said condenser, means placing said second generator in vapor communication with said condenser, fourth conduit means for conveying refrigerant from said condenser to said evaporator, fifth conduit means for returning strong absorbent solution to said absorber, the improvement comprising a control system including:
  (a) liquid level sensing means in said first generator for transmitting a signal at a liquid level above and below a predetermined liquid level,
  (b) first valve means in said second conduit means responsive to a signal from said liquid level sensing means, whereby when the liquid level rises beyond the predetermined level in said first generator said first valve means opens and when the liquid level falls below the predetermined level in said first generator, said valve means closes,
  (c) temperature sensing means in said chilled medium heat exchanger for transmitting a signal responsive to and varying with chilled water temperature,
  (d) selector control means for transmitting a predetermined signal selected from one of said liquid level sensing means and said temperature sensing means,
  (e) second valve means responsive to the signal transmitted from said selector control means, said second valve means being located in said first conduit means, said second valve means normally open to flow, said second valve means reducing flow in said first conduit means when chilled water temperature falls below a predetermined point and when said liquid level in said generator rises above a predetermined level.

2. The machine of claim 1 wherein the improvement comprises a pneumatic control system.

3. The machine of claim 2 wherein the selector control means includes a switching relay to provide an on-off control signal to said second valve means.

4. The machine of claim 3 wherein said off control signal causes said second valve means to close to a predetermined minimum flow point.

5. The machine of claim 2 wherein said second valve means proportions the flow in said conduit means responsive to the selected signal from said selector control means.

6. The machine of claim 1 wherein said first conduit means further comprises sixth conduit means for bypassing weak absorbent solution from said first conduit means to said absorber, said second valve means mounted in said sixth conduit means.

7. The machine of claim 1 further including throttling means in said first generator heat exchanger to vary the heat input to said first generator, said throttling means responsive to the signal from said temperature sensing means and modulating heat input to said first generator heat exchanger upon receiving a signal from said temperature sensing means.

8. The machine of claim 7 wherein said first generator heat exchanger is adapted to receive steam as a heat exchange medium, said throttling means modulating steam input to said first generator heat exchanger.

References Cited
UNITED STATES PATENTS 3,195,318    7/1965    Miner _____ 62—148

WILLIAM E. WAYNER, Primary Examiner

U.S. Cl. X.R.
62—148, 497